US012059690B2

(12) United States Patent
Imamura et al.

(10) Patent No.: US 12,059,690 B2
(45) Date of Patent: Aug. 13, 2024

(54) UNIT FOR ELECTROSTATIC FILTER AND ELECTROSTATIC FILTER

(71) Applicant: CANON KABUSHIKI KAISHA, Tokyo (JP)

(72) Inventors: Isao Imamura, Kanagawa (JP); Sachiko Yamauchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 285 days.

(21) Appl. No.: 17/152,129

(22) Filed: Jan. 19, 2021

(65) Prior Publication Data

US 2021/0229111 A1 Jul. 29, 2021

(30) Foreign Application Priority Data

Jan. 24, 2020 (JP) ................................ 2020-009958

(51) Int. Cl.
*B03C 3/28* (2006.01)
*B03C 3/64* (2006.01)

(52) U.S. Cl.
CPC . *B03C 3/28* (2013.01); *B03C 3/64* (2013.01)

(58) Field of Classification Search
CPC .... B03C 3/28; B03C 3/64; B03C 3/47; B03C 3/60; B03C 3/155; B03C 3/45; B03C 3/49; B03C 3/70; B03C 3/04; B03C 3/368; B03C 3/30; B03C 3/017; B03C 3/08; B03C 3/34; G03G 5/0214; B01D 39/1692; B01D 39/14; B01D 61/58; B01D 46/0001; B01D 46/0032; B01D 2239/0471; B01D 2239/0241; B01D 2239/10; B32B 7/023; B32B 27/08; G03F 7/004; F24F 8/192; F24F 8/194; A47L 9/12; A47L 9/14; H10N 30/07; H10N 30/063; H10N 30/067; H10N 30/057; H10N 30/053; H03H 9/178; H03H 9/19; H03H 9/205; H03H 9/485; H03H 9/52; H03H 9/505; H03H 9/525; H03H 9/581; H03H 9/585; H03H 9/587;
(Continued)

(56) References Cited

U.S. PATENT DOCUMENTS 3,967,027 A * 6/1976 Igarashi .................. B32B 27/08 428/483
4,390,800 A * 6/1983 Tanaka ..................... H01G 7/02 307/400
(Continued)

FOREIGN PATENT DOCUMENTS

JP 2000-026575 A 1/2000
JP 2000-107539 A 4/2000
(Continued)

OTHER PUBLICATIONS

Reasons for Refusal in Japanese Application No. 2020-009958 (Nov. 2023).

*Primary Examiner* — Christopher P Jones
*Assistant Examiner* — Sonji Turner
(74) *Attorney, Agent, or Firm* — Venable LLP

(57) ABSTRACT

A unit for electrostatic filter includes: a repeated structure of patterns that are respectively formed of one selected from at least two different substances having different work functions. The patterns formed of the different substances are put in contact with each other. The work functions differ by 1 eV or greater between the different substances put in contact with each other in the patterns.

22 Claims, 6 Drawing Sheets

(58) Field of Classification Search
CPC ........ H03H 9/588; H03H 9/132; H03H 9/173; H03H 9/174; H03H 9/172
See application file for complete search history.

(56) References Cited

U.S. PATENT DOCUMENTS

| | | | | | |
|---|---|---|---|---|---|
| 4,441,038 | A * | 4/1984 | Tanaka | H01G 7/02 | 307/400 |
| 4,443,711 | A * | 4/1984 | Tanaka | G11C 11/22 | 307/400 |
| 4,513,049 | A * | 4/1985 | Yamasaki | B32B 15/08 | 55/DIG. 39 |
| 4,592,815 | A * | 6/1986 | Nakao | B01D 39/1623 | 264/436 |
| 4,626,263 | A * | 12/1986 | Inoue | H01G 7/023 | 96/99 |
| 5,726,107 | A * | 3/1998 | Dahringer | D04H 1/4334 | 442/364 |
| 5,744,236 | A * | 4/1998 | Rohrbach | D01D 5/24 | 428/397 |
| 5,935,303 | A | 8/1999 | Kimura | | |
| 6,048,614 | A * | 4/2000 | Rohrbach | D04H 3/02 | 428/397 |
| 6,344,526 | B1 | 2/2002 | Noguchi et al. | | |
| 6,491,743 | B1 * | 12/2002 | Joannou | B03C 3/155 | 96/67 |
| 7,658,469 | B2 | 2/2010 | Hino et al. | | |
| 8,187,511 | B2 | 5/2012 | Nagai et al. | | |
| 8,828,227 | B2 | 9/2014 | Nagai et al. | | |
| 9,029,074 | B2 | 5/2015 | Hamade et al. | | |
| 10,010,892 | B2 * | 7/2018 | Koike | B03C 3/28 | |
| 10,213,716 | B2 * | 2/2019 | Kitagawa | B01D 39/1623 | |
| 2005/0089713 | A1 * | 4/2005 | Satsuki | C09K 11/06 | 548/218 |
| 2010/0083838 | A1 * | 4/2010 | Togashi | B01D 39/1623 | 96/10 |
| 2010/0107412 | A1 | 5/2010 | Hino et al. | | |
| 2010/0212506 | A1 * | 8/2010 | Togashi | B01J 20/28038 | 96/154 |
| 2011/0095626 | A1 * | 4/2011 | Shih | H01G 7/028 | 307/400 |
| 2016/0224140 | A1 * | 8/2016 | Matsuda | G06F 3/041 | |
| 2017/0207415 | A1 * | 7/2017 | Ii | B32B 27/28 | |
| 2018/0019134 | A1 * | 1/2018 | Choi | H01L 29/792 | |
| 2020/0009489 | A1 * | 1/2020 | Sugamata | B32B 27/205 | |

FOREIGN PATENT DOCUMENTS

| | | | | | |
|---|---|---|---|---|---|
| JP | 3566477 | B2 | | 9/2004 | |
| JP | 2008-100430 | A | | 5/2008 | |
| JP | 4424751 | B2 | | 3/2010 | |
| JP | 2014-233688 | A | | 12/2014 | |
| JP | 2015-037772 | A | | 2/2015 | |
| JP | 2015098022 | A | * | 5/2015 | B01D 39/1623 |
| JP | 6053580 | B2 | | 12/2016 | |
| KR | 20180043561 | A | * | 4/2018 | |
| WO | 2016/052440 | A1 | | 4/2016 | |

* cited by examiner

UNIT FOR ELECTROSTATIC FILTER AND ELECTROSTATIC FILTER

BACKGROUND OF THE INVENTION

Field of the Invention

The present invention relates to a unit for electrostatic filter and an electrostatic filter.

Description of the Related Art

In general, an electrostatic filter has been used to collect solid particles such as powdery dust floating in the air. As the electrostatic filter, there has been known a filter that is made by impregnating a sheet-shaped base material formed of felt or non-woven cloth in which sheep wool is a main component with synthetic resin such as phenol resin and then applying friction and impact to the filter to electrostatically charging in a mechanical way, for example.

Japanese Patent No. 3566477 discloses an electrostatic filter that is made by attaching resin to a base material component in which sheep wool and thermoplastic synthetic fibers are mixed with each other. The resin attached to this base material component is formed of a mixture of at least perfluoroalkyl acrylate copolymer resin and para tertiary butylphenol formaldehyde resin and is electrostatically charged.

In recent years, an electret filter as disclosed in Japanese Patent Application Laid-Open No. 2014-233688 has been the mainstream. This electret filter is manufactured by forming a film of a resin component containing two or more types of non-polar resin, charging the film, and then processing the film into a form of fibers, for example. There is described that the thus-formed film contains polyolefin resin as the main component and has a sea-island structure.

SUMMARY OF THE INVENTION

According to an aspect of the present invention, here is provided a unit for electrostatic filter, including: a repeated structure of patterns that are respectively formed of one selected from at least two different substances having different work functions, the patterns formed of the different substances being put in contact with each other, in which the work functions differ by 1 eV or greater between the different substances constituting the patterns put in contact with each other.

According to another aspect of the present invention, an electrostatic filter including the above-described unit for electrostatic filter is provided.

Further features of the present invention will become apparent from the following description of exemplary embodiments with reference to the attached drawings.

DESCRIPTION OF THE EMBODIMENTS

The electrostatic filter described in Japanese Patent No. 3566477 is subjected to the charging processing to apply mechanical impact and friction during the manufacturing procedure. In the manufacturing procedure of the electret filter described in Japanese Patent Application Laid-Open No. 2014-233688, the filter is charged by applying charges to the formed film.

In those types of filters, the charge itself is deteriorated with age depending on the usage environment. Thus, an additional charge mechanism may have been required. Additionally, trash and dust may have appeared during the charging processing to apply the mechanical impact and friction.

Moreover, there has been a problem that the collection properties of the filter are considerably reduced especially when an oily organic compound component such as a plasticizer, a fluxing agent, and a low molecular organic substance contained in architectural materials, paints, and so on is attached to the filter. Therefore, in some cases, different means such as an activated carbon filter may be required.

An object of the present invention is to solve the above-described problems and to provide a unit for electrostatic filter and an electrostatic filter that are charged without charging processing and that inhibit the deterioration with age of the collection properties.

The unit for electrostatic filter according to the present invention includes: a repeated structure of patterns that are respectively formed of one selected from at least two different substances having different work functions, the patterns formed of the different substances being put in contact with each other. In the present invention, the work function difference between the different substance can be used to utilize contact charging due to the contact between the substances and induction charging that occurs due to a collision of fine particles and the like in atmosphere with the substances put in contact with each other. Therefore, it is possible to maintain the charging effects semi-permanently and to inhibit deterioration with age of the collection properties. Additionally, since charging processing during manufacturing is not required, the manufacturing is easy, and it is possible to prevent occurrence of trash and dust due to the charging processing.

Such effects obtained by the present invention can be implemented by repeating the structures in which the patterns that are formed of the substances having different work functions, respectively. Since the unit for electrostatic filter according to the present invention can implement the collection properties by using the above-described simple structure, a degree of freedom for shape is high, and thus it is possible to form a unit for electrostatic filter in a desired shape.

Figure 1:
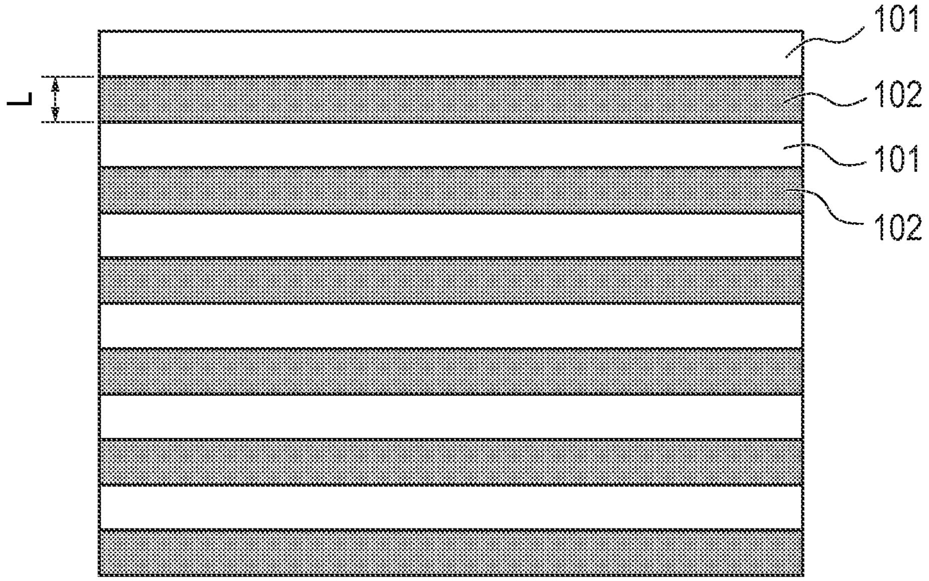
FIG. 1 is a diagram illustrating an example of arrangement of patterns in a unit for electrostatic filter according to the present invention.

FIG. 1 illustrates an example of a unit for electrostatic filter of an embodiment according to the present invention. Structures, which each include a first pattern layer 101 formed of a first substance and a second pattern layer 102 formed of a second substance adjacent and bonded to each other, are arranged repeatedly. In this arrangement, the first pattern layer is arranged on a base material plane in the line-and-space pattern (L/S pattern). Each line portion is comparable to the first pattern layer. On the other hand, the second pattern layer 102 formed of a different substance, which has a different work function from that of the first substance constituting the first pattern layer 101, is arranged in each space portion.

The first pattern layer 101 and the second pattern layer 102 are charged due to the work function difference between the substances constituting the first and second pattern layers 101 and 102. The pattern layer formed of a substance having a great work function is charged positively (+), while the pattern layer formed of a substance having a small work function is charged negatively (−). The pattern layer that is positively (+) charged attracts particles (trash, dust) having negative (−) charges, and the pattern layer that is negatively (−) charged attracts particles (trash, dust) having positive (+) charges.

The charge properties in the unit for electrostatic filter according to this embodiment become the highest in an interface in which the pattern layers formed of different substances are bonded to each other, and become lower as being away from the interface. For this reason, with the objective of efficiently securing a sufficient charged region, it is favorable that a distance (L) between the adjacent interfaces is sufficiently small. That is, it is favorable that the distance (L) between a first pattern of patterns put in contact with each other (pattern layers adjacent and bonded to each other) and another pattern (pattern layer), which is arranged on the opposite side of a second pattern (pattern layer) of the patterns with respect to the first pattern, is sufficiently small. In FIG. 1, it is favorable that the distance (L) between the first pattern layer 101 and another first pattern layer 101, which is arranged on the opposite side of the second pattern layer 102 with respect to the above-mentioned first pattern layer 101, is sufficiently small. This distance (L) is comparable to the distance between a boundary corresponding to the bonded interface between the first pattern layer 101 and the second pattern layer 102 and a boundary corresponding to the bonded interface between the second pattern layer 102 and the other first pattern layer 101 adjacent and bonded to the second pattern layer. That is, the distance (L) is comparable to the width of the space of the L/S pattern.

The distance (L) between a first pattern of patterns put in contact with each other (pattern layers adjacent and bonded to each other) and another pattern (pattern layer), which is arranged on the opposite side of a second pattern (pattern layer) of the patterns with respect to the first pattern, may be set in a range from 1.2 mm or smaller, and is preferably 1.0 mm or smaller. The distance (L) is more preferably 0.8 mm or smaller, and is further preferably 0.6 mm or smaller. With the objective of securing a sufficient charged region, the distance (L) is preferably 0.05 mm or greater, and is more preferably 0.1 mm or greater.

When the work function difference (Wd) between the substances constituting the patterns put in contact with each other (pattern layers adjacent and bonded to each other), it is impossible to obtain a sufficient amount of charges and charged region. For this reason, with the objective of obtaining a sufficient charged region, it is favorable to form the patterns put in contact with each other (pattern layers adjacent and bonded to each other) by using substances having the work function difference (Wd) of 1 eV or greater, or preferably 1.1 eV or greater. The work function difference (Wd) between the substances is not particularly limited as long as it is 1 eV or greater, and it is possible to use substances having the work function difference (Wd) of 2.0 eV or smaller, for example. Use of substances having the work function difference (Wd) of 1.8 eV or smaller is preferable, and use of substances having the work function difference (Wd) of 1.6 eV or smaller is more preferable.

Figure 2:
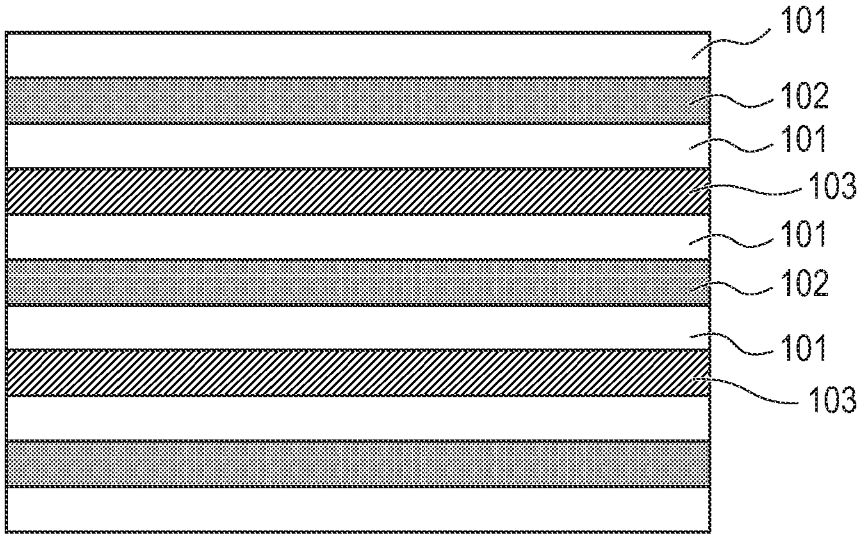
FIG. 2 is a diagram illustrating another example of arrangement of patterns in the unit for electrostatic filter according to the present invention.

In the arrangement of pattern layers in the unit for electrostatic filter according to this embodiment, it is possible to use pattern layers formed of three or more different types of substances, respectively, as illustrated in FIG. 2.

In this case of arrangement, the first pattern layer is arranged on the base material plane in the line-and-space pattern (L/S pattern). Each line portion is comparable to the first pattern layer. Other pattern layers formed of different substances, which have different work functions from that of the first substance constituting the first pattern layer, are arranged in the space portions. The other pattern layers may be multiple types of pattern layers formed of multiple types of substances, respectively. In FIG. 2, the second pattern layers 102 and third pattern layers 103 are arranged alternately as the other pattern layers in the space portions.

The arrangement illustrated in FIG. 2 includes the first pattern layer 101 formed of the first substance, the second pattern layer 102 formed of the second substance, and the third pattern layer 103 formed of a third substance. The arrangement is made so that the first pattern layer and the second pattern layer are adjacent and bonded to each other, and the first pattern layer and the third pattern layer are adjacent and bonded to each other. The second and third pattern layers are each arranged between two first pattern layers. The arrangements in which the first, second, and third pattern layers are arrayed in this way are repeated.

The order of array of the first, second, and third pattern layers is not necessarily the order illustrated in FIG. 2. As long as the substances constituting the adjacent pattern layers have the sufficient work function difference, or preferably the work function difference is 1 eV or greater, the pattern layers may be arrayed in a different order.

Figure 3:
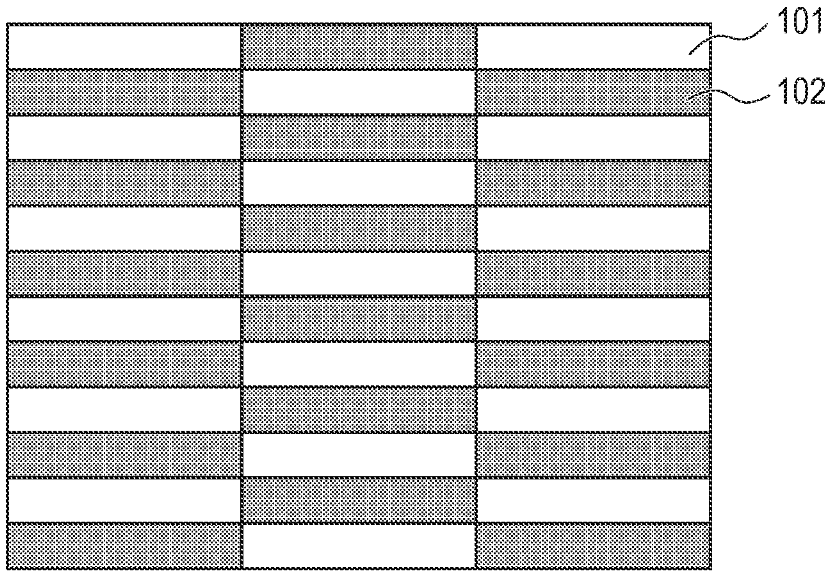
FIG. 3 is a diagram illustrating another example of arrangement of patterns in the unit for electrostatic filter according to the present invention.
Figure 4:
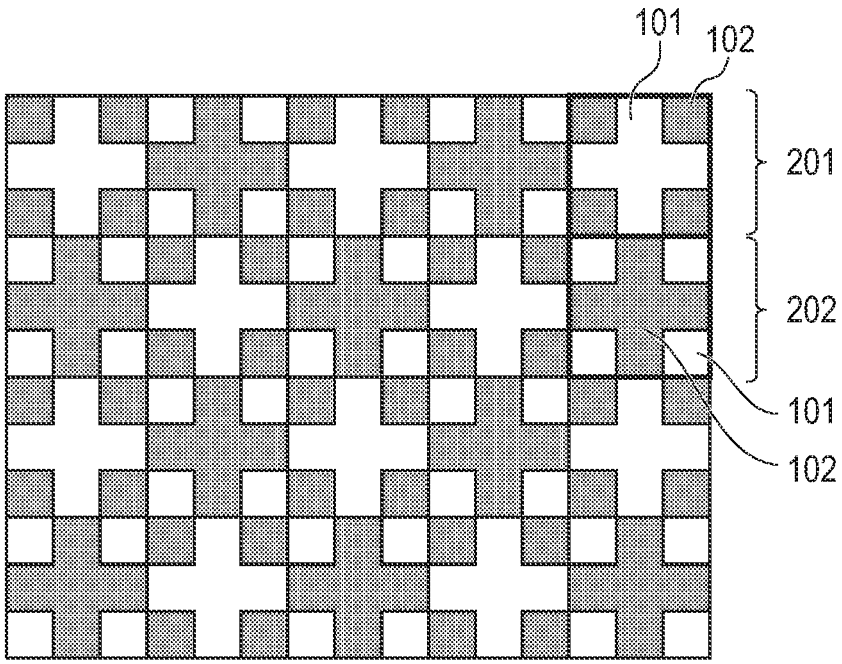
FIG. 4 is a diagram illustrating another example of arrangement of patterns in the unit for electrostatic filter according to the present invention.

In the arrangement and the shape of pattern layers in the unit for electrostatic filter according to this embodiment, it is possible to efficiently form a region having the sufficiently high charge properties by increasing the number of interfaces between the pattern layers and inhibiting the distance between the interfaces from being long, as illustrated in FIGS. 3 and 4.

In FIG. 3, the first pattern layer 101 and the second pattern layer 102 are arrayed alternately along a first direction (the vertical direction of the paper surface), and the first pattern layer and the second pattern layer are arrayed alternately along a second direction orthogonal to the first direction. The plane shape of the first and second pattern layers is a rectangle in which the longitudinal direction thereof is along the second direction.

In FIG. 4, a first section region 201 and a second section region 202 each including the pattern layers arranged in a quadrangular (rectangular or square) region are arrayed alternately along the first direction and along the second direction orthogonal to the first direction. The first section region 201 includes the first pattern layer 101 in a cross shape formed of the first substance and the second pattern layers 102 in a quadrangular (rectangular or square) shape formed of the second substance at four corners. The second section region 202 is an inverse pattern layer of the first section region 201 and includes the second pattern layer 102 in a cross shape formed of the second substance and the first pattern layers 101 in a quadrangular (rectangular or square) shape formed of the first substance at four corners.

Figure 5:
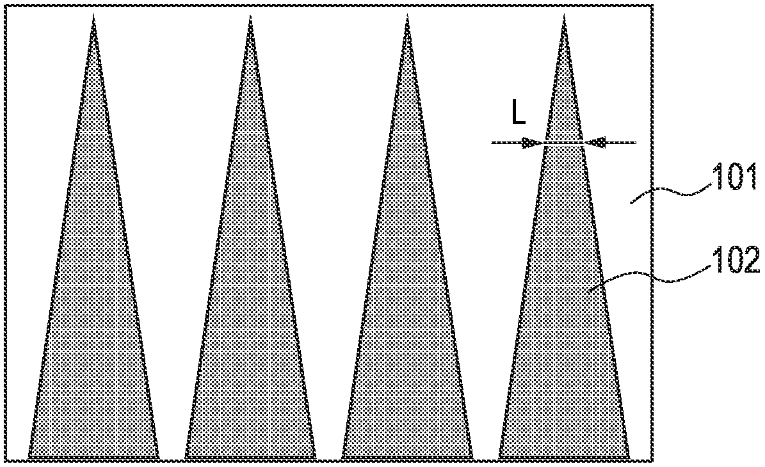
FIG. 5 is a diagram illustrating another example of arrangement of patterns in the unit for electrostatic filter according to the present invention.

In the arrangement and the shape of pattern layers in the unit for electrostatic filter unit according to this embodiment, the pattern layers may have a tapered shape as illustrated in FIG. 5. When such a unit for electrostatic filter is used upright such that a tip end of the tapered shape is positioned upward, an attached liquid substance is likely to trickle down. Consequently, it is possible to reduce the amount of the attached liquid substance and to inhibit the deterioration in the collection effect due to the liquid substance.

In FIG. 5, the second pattern layer 102 formed of the second substance is in a shape tapered along the first direction (the vertical direction of the paper surface) (a shape in which the width of the second pattern layer 102 in the second direction perpendicular to the first direction is narrowed gradually along the first direction). This second pattern layer and the first pattern layer 101 formed of the first substance as an inverse pattern of the second pattern layer are arranged alternately along the second direction perpendicular to the first direction. The distance (L) between the interface between the first pattern layer and the second pattern layer and an interface adjacent to the above-mentioned interface preferably includes a portion of 1.0 mm or smaller on the side including at least the tip end portion. In this distance (L), it is more preferable that a region of 50% or greater of the length in the first direction is 1.0 mm or smaller, for example.

The present invention is described above with an example where the pattern layers are provided on the base material plane; however, with the objective of effectively using the area, it is also possible to provide the pattern layers on a wavy base material or a bumpy base material. If a resin member is used as the base material, the resin member is able to be curved or bent, and thus it facilitates the processing when mounting the base material into the electrostatic filter.

The resin constituting the base material may be used as the first substance or the second substance. For example, it is possible to form the pattern layer formed of the first substance on the base material formed of the second substance and to use the work function difference between the pattern layer (the first substance) and the base material portion in which no pattern layer is formed (the second substance). In this case, the distance (L) between the patterns is comparable to a distance between a boundary of the pattern layer (the first substance) and the base material portion in which no pattern layer is formed (the second substance) and a boundary of the base material portion in which no pattern layer is formed and another pattern layer (the first substance) adjacent to the base material.

The following organic compounds and inorganic compounds may be used as the substances constituting the pattern layers in the embodiment of the present invention.

The substances having great work functions may be, for example, organic compounds such as fluorine-containing resin like polytetrafluoroethylene (PTFE), silicone resin, vinyl chloride resin, and polyolefin resin like polypropylene and polyethylene. Out of these substances, with the objective of adhesiveness, workability, and heat resistance, the fluorine-containing resin and the silicone resin are preferable, and a substance that can be in the liquid form to be applied and that has reactivity (photosensitivity) is preferably used. Additionally, fluorine-containing photosensitive resin including the fluorine-containing resin may be used.

The fluorine-containing resin may be CYTOP (product name, registered trademark) manufactured by AGC Inc. or Obbligato (product name, registered trademark) manufactured by AGC COAT-TECH Co., Ltd.

The fluorine-containing photosensitive materials may be the materials disclosed in Japanese Patent Nos. 6053580 and 4424751 and Japanese Patent Application Laid-Open No. 2000-26575.

The substances having relatively low work functions may be, for example, inorganic compounds such as glass, and organic compounds such as rayon, polyamide (including nylon), polyimide, urethane resin, and epoxy resin. Out of these substances, with the objective of adhesiveness, workability, and heat resistance, the urethane resin and the epoxy resin are preferable, and a substance that can be in the liquid form to be applied and that has reactivity (photosensitivity) is preferably used.

Especially, the urethane resin may be preferably used out of the substances constituting the pattern layer. The urethane resin is a reactant from isocyanate and polyol. Since the urethane resin is in the liquid form before reaction and has high reactivity, it is possible to cure the urethane resin at ordinary temperature or low temperature. Additionally, since the urethane resin has the work function that is not changed greatly depending on the type of a curing agent like the epoxy resin, it is more preferable to use the urethane resin.

The urethane resin may be CV6002 (product name) (two part urethane resin; base resin: butadiene skeleton polyol, curing agent: isocyanate) manufactured by Panasonic Corporation, UF-705A/UF-705-1B (product name) and UF-820A/B (product name) manufactured by Sanyu Rec Co., Ltd., or the like.

The epoxy resin may be NR200C (product name) manufactured by Sanyu Rec Co., Ltd., 2230B (product name) manufactured by ThreeBond Co., Ltd., Chipcoat (registered trademark) G8345-29 (product name) manufactured by NAMICS CORPORATION, or the like.

The unit for electrostatic filter according to the embodiment of the present invention is described above; however, the configuration is not limited to the above-described shapes and materials.

The electrostatic filter according to the embodiment of the present invention can have a structure in which the above-described unit for electrostatic filter is arranged sterically.

Figure 6:
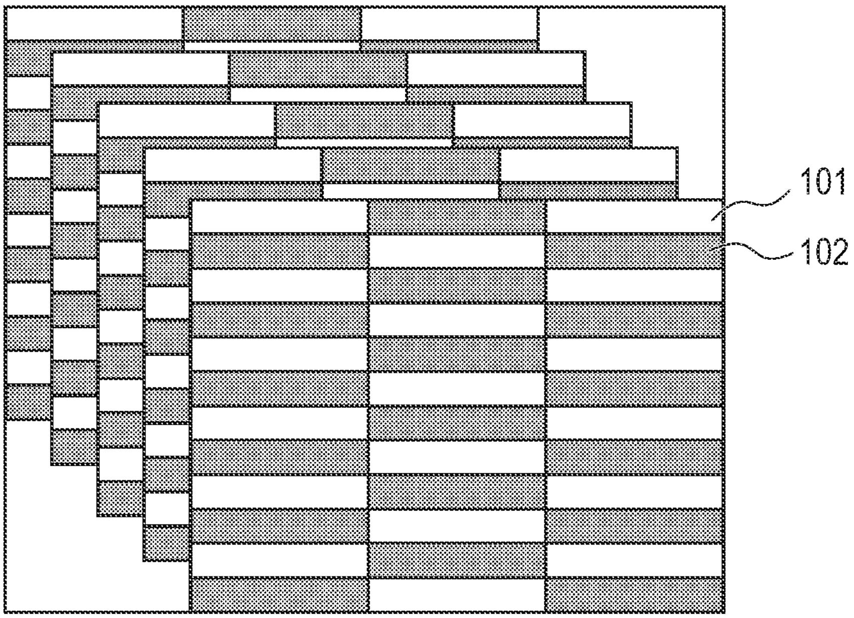
FIG. 6 is a diagram illustrating a configuration example of an electrostatic filter according to the present invention.

For example, as illustrated in FIG. 6, the electrostatic filter can have a structure in which the units for electrostatic filter each including the base material having two sides in which the pattern layers illustrated in FIG. 3 are arranged are arrayed parallel to each other. In order to sterically arrange the units for electrostatic filter, adhering, clamping, storing in a housing by using a spacer, and so on may be performed, for example.

The structure of the electrostatic filter is not limited to the above-described configuration, and a structure in which the electrostatic filter units are arranged in a honeycomb shape, a lattice shape, a tube shape, or the like may be applicable as necessary.

Since the unit for electrostatic filter of the present invention collects foreign substances such as trash and dust with the surface thereof, it is different from the conventional transparent filter such as non-woven cloth in that it is easy to remove the collected foreign substances.

In the unit for electrostatic filter of the present invention, the patterns according to the present invention are formed on an electrically conductive substrate, and the electrically conductive substrate is attached instead of a metal plate of an electronic dust collection filter. Therefore, it is possible to deliver more power-saving and excellent performance of dust collection.

Hereinafter, the present invention is described in detail with examples and comparative examples; however, the present invention is not limited to those examples.

Example 1

A unit for electrostatic filter in which pattern layers as illustrated in FIG. 1 were formed was fabricated by the following method.

A glass substrate with 4 cm square and a thickness of 1.1 mm was prepared as the base material. In order to form the first pattern layer formed of the first substance on this glass substrate first, a composition 1 (photosensitive fluorine-containing resin material) in which the following components are mixed was prepared as a first pattern layer formation material.

Components and Compound Ratio of Composition 1

- Epoxy resin (product name: EHPE (registered trademark)-3158, manufactured by Daicel Corporation): 34 parts by mass
- 2,2-bis(4-glycidyloxyphenyl) hexafluoropropane: 25 parts by mass
- 1,4-bis(2-hydroxyhexafluoroisopropyl)benzene: 25 parts by mass
- 3-(2-perfluorohexyl ethoxy)-1,2-epoxy propane: 16 parts by mass
- Epoxy silane coupling agent (product name: A-187, manufactured by NUC Corporation): 4 parts by mass
- Photopolymerization initiator (product name: SP-170, manufactured by ADEKA CORPORATION): 1.5 parts by mass
- Diethylene glycol monoethyl ether: 200 parts by mass The composition 1 was spin coated on the glass substrate, and then exposure was performed by using a mask having the line-and-space (L/S) pattern with a width of 0.1 mm (exposure amount 5 J/cm$^2$). Next, four minutes of baking was performed on a hot plate at 100° C., development was performed by using xylene subsequently, and two hours (hr) of substantial curing was performed at 150° C. Consequently, the L/S pattern in which the line-shaped first pattern layers and the spaces with a width of 0.1 mm were arranged alternately was obtained.

Next, in order to form the second pattern layer formed of the second substance in the space portion of the obtained L/S pattern, the two part urethane resin (UF-705A/UF-705-1B (product name), manufactured by Sanyu Rec Co., Ltd.) was prepared as a second pattern layer formation material. This two part urethane resin was applied by a dispenser, and then three hours (hr) of thermal curing was performed at 80° C. Since the first pattern layer was formed of the fluorine-containing resin, even if the applied liquid was spread over the first pattern layer during the application, the spread part disappeared because of the oleophobic properties of the first pattern layer. Consequently, the second pattern layer with a width of 0.1 mm could be formed in each space portion.

In this case, the second pattern layer formation material was applied by a dispenser; however, since the first pattern layer has the oleophobic properties, the second pattern layer formation material may be applied by dipping or the like so as to make the application on the entire surface.

The work functions of the substances constituting the formed first and second pattern layers are varied depending on an additive and the compound ratio. In light of this circumstance, the approximate work functions of the first substance constituting the first pattern layer and the second substance constituting the second pattern layer were obtained as described below.

Since the rank orders of the work functions and the triboelectric series between the substances are the same, it is possible to determine whether the work function of a specific substance is greater or smaller than that of an already-known substance by obtaining the rank order of the triboelectric series based on already-known materials.

The triboelectric series having the values on which the work function of already-known resin is based is as follow.

- PTFE (polytetrafluoroethylene): 5.4 eV
- PPS (polyphenylene sulfide): 5.1 eV
- PP (polypropylene): 4.9 eV
- Polyethylene: 4.2 eV
- Nylon: 3.6 eV The charge property of the first substance (the fluorine-containing resin) formed of the composition 1 is in between the PTFE and the PPS of the above-described triboelectric series (that is, the work function is in a range of greater than 5.1 eV and smaller than 5.4 eV). Therefore, the work function of the first substance is estimated to be 5.2 eV or greater.

The second substance (the urethane resin) formed of the two part urethane resin (product name: 705A/UF-705-1B, manufactured by Sanyu Rec Co., Ltd.) is in between the polyethylene and the nylon of the above-described triboelectric series (that is, the work function is in a range of greater than 3.6 eV and smaller than 4.2 eV). Therefore, the work function of the second substance is estimated to be 4.1 eV or smaller.

Accordingly, the work function difference between the first substance and the second substance is estimated to be 1.1 eV or greater.

Example 2

A unit for electrostatic filter was fabricated in the same manner as in Example 1, except obtaining the L/S pattern in which the line-shaped first pattern layers and the spaces with a width of 0.3 mm were arranged alternately by using a mask having the L/S pattern with a width of 0.3 mm.

Example 3

A unit for electrostatic filter was fabricated in the same manner as in Example 1, except obtaining the L/S pattern in which the line-shaped first pattern layers and the spaces with a width of 0.5 mm were arranged alternately by using a mask having the L/S pattern with a width of 0.5 mm.

Example 4

A unit for electrostatic filter was fabricated in the same manner as in Example 1, except obtaining the L/S pattern in which the line-shaped first pattern layers and the spaces with a width of 1.0 mm were arranged alternately by using a mask having the L/S pattern with a width of 1.0 mm.

Example 5

A unit for electrostatic filter in which pattern layers as illustrated in FIG. 1 were formed was fabricated by the following method.

A glass substrate with 4 cm square and a thickness of 1.1 mm was prepared as the base material. In order to form the first pattern layer formed of the first substance on this glass substrate first, the fluorine-containing resin (CYTOP (registered trademark) CTL-809M (product name), manufactured by AGC COAT-TECH Co., Ltd.) was prepared as the first pattern layer formation material.

The fluorine-containing resin was applied by a block by the flexography printing on the glass substrate so as to form the L/S pattern with a width of 0.1 mm. Subsequently, two hours (hr) of heating was performed at 150° C. Consequently, the L/S pattern in which the line-shaped first pattern layers and the spaces with a width of 0.1 mm were arranged alternately was obtained.

Next, in order to form the second pattern layer formed of the second substance in the space portion of the obtained L/S pattern, the one part epoxy resin (Chipcoat (registered trademark) G8345-29 (product name), manufactured by NAMICS CORPORATION) was prepared as the second pattern layer formation material. This one part epoxy resin was applied by a dispenser, and two hours (hr) of thermal curing was performed at 150° C. Since the first pattern layer formed in advance has the oleophobic properties, spread of the applied liquid over the first pattern layer disappeared.

The work function difference between the first and second substances constituting the formed first and second pattern layers, respectively, were obtained as with Example 1.

The charge property of the first substance (the fluorine-containing resin) formed of CYTOP (registered trademark) CTL-809M (product name) is in between the PTFE and the PPS of the above-described triboelectric series (that is, the work function is in a range of greater than 5.1 eV and smaller than 5.4 eV). Therefore, the work function of the first substance is estimated to be 5.2 eV or greater.

The charge property of the second substance (the epoxy resin) formed of Chipcoat (registered trademark) G8345-29 (product name, manufactured by NAMICS CORPORATION) is in between the polyethylene and the nylon of the above-described triboelectric series (that is, the work function is in a range of greater than 3.6 eV and smaller than 4.2 eV). Therefore, the work function of the second substance is estimated to be 4.1 eV or smaller.

Therefore, the work function difference between the first substance and the second substance is estimated to be 1.1 eV or greater.

Example 6

A unit for electrostatic filter was fabricated in the same manner as in Example 5, except the fluorine-containing resin (the first pattern layer formation material) was applied by a block by the flexography printing so as to form the L/S pattern with a width of 0.3 mm.

Example 7

A unit for electrostatic filter was fabricated in the same manner as in Example 5, except the fluorine-containing resin (the first pattern layer formation material) was applied by a block by the flexography printing so as to form the L/S pattern with a width of 0.5 mm.

Example 8

A unit for electrostatic filter was fabricated in the same manner as in Example 5, except the fluorine-containing resin (the first pattern layer formation material) was applied by a block by the flexography printing so as to form the L/S pattern with a width of 1.0 mm.

Example 9

A unit for electrostatic filter in which pattern layers illustrated in FIG. 2 were formed was fabricated by the following method.

A glass substrate with 4 cm square and a thickness of 1.1 mm was prepared as the base material. In order to form the first pattern layer formed of the first substance on this glass substrate first, the above-described composition 1 (the photosensitive fluorine-containing resin material) was prepared as the first pattern layer formation material.

The composition 1 was spin coated on the glass substrate, and then exposure was performed by using a mask having the L/S pattern with a width of 0.5 mm (exposure amount 5 J/cm$^2$). Next, four minutes of baking was performed on a hot plate at 100° C., development was performed by using xylene subsequently, and two hours (hr) of substantial curing was performed at 150° C. Consequently, the L/S pattern in which the line-shaped first pattern layers and the spaces with a width of 0.5 mm were arranged alternately was obtained.

Next, the second pattern layer formation material was applied to the space portion comparable to the second pattern layer (the pattern layer formed of the second substance) illustrated in FIG. 2 in the obtained L/S pattern. The one part epoxy resin (Chipcoat (registered trademark) G8345-29 (product name), manufactured by NAMICS CORPORATION) was used as the second pattern layer formation material. This one part epoxy resin was applied by a dispenser, and two hours (hr) of thermal curing was performed at 150° C.

Then, the two part urethane resin (UF-705A/UF-705-1B (product name), manufactured by Sanyu Rec Co., Ltd.) was applied by a dispenser as the third pattern layer formation material to the space portion comparable to the third pattern layer (the pattern layer formed of the third substance) illustrated in FIG. 2 in the obtained L/S pattern, and subsequently three hours (hr) of thermal curing was performed at 80° C.

Since there is formed the first pattern layer formed of the fluorine-containing resin material, even if the applied liquid, which is the second and third pattern layer formation materials, was spread over the first pattern layer, the spread part disappeared because of the oleophobic properties of the first pattern layer.

According to the above-described triboelectric series, both the work function difference between the first substance (the fluorine-containing resin) and the second substance (the epoxy resin) as well as the work function difference between the first substance (the fluorine-containing resin) and the third substance (the urethane resin) are estimated to be 1.1 eV or greater.

Although the application for forming the second and third pattern layers was performed herein, if an epoxy substrate is used instead of the glass substrate, for example, it is possible to reduce the number of steps by not applying the one part epoxy resin and leaving a substrate surface of the space portion comparable to the second pattern layer.

Example 10

A unit for electrostatic filter was fabricated in the same manner as in Example 9, except forming the first pattern layer by using a mask having the L/S pattern with a width of 1.0 mm.

Comparative Example 1

A unit for electrostatic filter in which the first and second pattern layers illustrated in FIG. 1 were formed was fabricated by the following method.

A glass substrate with 4 cm square and a thickness of 1.1 mm was prepared as the base material. In order to form the first pattern layer formed of the first substance on this glass substrate first, the one part epoxy resin (Chipcoat (registered trademark) G8345-29 (product name), manufactured by NAMICS CORPORATION) was prepared as the first pattern layer formation material.

This one part epoxy resin was applied by a dispenser so as to form the L/S pattern with a space width of 0.5 mm on the glass substrate, and two hours (hr) of thermal curing was performed at 150° C. Consequently, the L/S pattern in which the line-shaped first pattern layers and the spaces with a width of 0.5 mm were arranged alternately was obtained.

Next, in order to form the second pattern layer formed of the second substance, the two part urethane resin (UF-705A/UF-705-1B (product name), manufactured by Sanyu Rec Co., Ltd.) was prepared as the second pattern layer formation material. This two part urethane resin was applied by a dispenser to the space portion in the obtained L/S pattern, and three hours (hr) of thermal curing was performed at 80° C.

The charge property of the first substance formed of the one part epoxy resin (Chipcoat (registered trademark) G8345-29 (product name), manufactured by NAMICS CORPORATION) and the charge property of the second substance formed of the two part urethane resin (UF-705A/UF-705-1B (product name), manufactured by Sanyu Rec Co., Ltd.) are in between the polyethylene and the nylon of the above-described triboelectric series. That is, the work functions are in a range of greater than 3.6 eV and smaller than 4.2 eV. Therefore, the work functions of the first substance and the second substance are estimated to be between 3.7 eV and 4.1 eV, inclusive. Accordingly, the work function difference between the first substance and the second substance is estimated to be 0.4 eV at a maximum.

Comparative Example 2

A unit for electrostatic filter was fabricated in the same manner as in Comparative Example 1, except forming the first pattern layer by the application to form the L/S pattern with a space width of 1.0 mm.

Comparative Example 3

A unit for electrostatic filter in which the pattern layers illustrated in FIG. 1 were formed was fabricated by the following method.

A glass substrate with 4 cm square and a thickness of 1.1 mm was prepared as the base material. In order to form the first pattern layer formed of the first substance on this glass substrate first, the above-described composition 1 (the photosensitive fluorine-containing resin material) was prepared as the first pattern layer formation material.

The composition 1 was spin coated on the glass substrate, and then exposure was performed by using a mask having the L/S pattern with a width of 0.5 mm (exposure amount 5 J/cm$^2$). Next, four minutes of baking was performed on a hot plate at 100° C., development was performed by using xylene subsequently, and two hours (hr) of substantial curing was performed at 150° C. Consequently, the L/S pattern in which the line-shaped first pattern layers and the spaces with a width of 0.5 mm were arranged alternately was obtained.

Next, in order to form the second pattern layer formed of the second substance, the fluorine-containing resin (CYTOP (registered trademark) CTL-809M (product name), manufactured by AGC COAT-TECH Co., Ltd.) was prepared as the second pattern layer formation material. This fluorine-containing resin was applied by the the flexography printing to the space portion in the obtained L/S pattern, and two hours (hr) of heating was performed at 150° C.

The charge property of the first substance formed of the composition 1 and the charge property of the second substance formed of the fluorine-containing resin (CYTOP (registered trademark) CTL-809M (product name), manufactured by AGC COAT-TECH Co., Ltd.) are in between the PTFE and the PPS of the above-described triboelectric series. That is, the work functions are in a range of greater than 5.1 eV and smaller than 5.4 eV. Therefore, the work functions of the first substance and the second substance are estimated to be between 5.2 eV and 5.3 eV, inclusive. Accordingly, the work function difference between the first substance and the second substance is estimated to be 0.1 eV at a maximum.

Comparative Example 4

A unit for electrostatic filter was fabricated as in Comparative Example 3, except obtaining the L/S pattern in which the line-shaped first pattern layers and the spaces with a width of 1.0 mm were arranged alternately by using a mask having the L/S pattern with a width of 1.0 mm.

[Method of Evaluating Collection Effect]

The thus-obtained unit for electrostatic filter was put inside a draft device and was maintained in a state of continuous suction at 0.6 m/s with the draft entrance closed. In this process, the temperature was 22° C., and the humidity was 40%. The unit for electrostatic filter maintained in this state was observed for three weeks with a metallographic microscope. The number of days until a droplet was observed on a surface of the unit for electrostatic filter for the first time and the state of generation of an oil droplet after three weeks passed were determined based on the following evaluation standard.

As a result of analysis of the generated droplet, it was found out that the droplet was an organic chemical substance such as a plasticizer or a fluxing agent of materials used in architectural materials and the like.

[Evaluation Standard of Generation Status of Droplet]

Excellent: There is a droplet on every surface of any one of the pattern layers.

Good: There is a droplet near a boundary (interface) in which any one of the pattern layers and another pattern layer are adjacent and bonded to each other (no droplet in a central portion away from the vicinity of the boundary).

Poor: No droplet is generated.

TABLE 1

| | Example | | | | | | | | | |
|---|---|---|---|---|---|---|---|---|---|---|
| Item | 1 | 2 | 3 | 4 | 5 | 6 | 7 | 8 | 9 | 10 |
| First pattern layer formation material | Photosensitive fluorine-containing resin | | | | Fluorine-containing resin | | | | Photosensitive fluorine-containing resin | |

TABLE 1-continued

| Item | | Example | | | | | | | | | |
|---|---|---|---|---|---|---|---|---|---|---|---|
| | | 1 | 2 | 3 | 4 | 5 | 6 | 7 | 8 | 9 | 10 |
| Second pattern layer formation material | | Two part urethane resin | | | | One part epoxy resin | | | | One part epoxy resin | |
| Third pattern layer formation material | | — | — | — | — | — | — | — | — | Two part urethane resin | |
| Space width of L/S (mm) | | 0.1 | 0.3 | 0.5 | 1.0 | 0.1 | 0.3 | 0.5 | 1.0 | 0.5 | 1.0 |
| Evaluation | Number of days until generation | 7 | 7 | 7 | 7 | 8 | 8 | 8 | 8 | 7 | 7 |
| | After three weeks | Excellent | Excellent | Excellent | Good | Excellent | Excellent | Excellent | Good | Excellent | Good |

| Item | | Comparative Example | | | |
|---|---|---|---|---|---|
| | | 1 | 2 | 3 | 4 |
| First pattern layer formation material | | One part epoxy resin | | Photosensitive fluorine-containing resin | |
| Second pattern layer formation material | | Two part urethane resin | | Fluorine-containing resin | |
| Third pattern layer formation material | | — | — | — | — |
| Space width of L/S (mm) | | 0.5 | 1.0 | 0.5 | 1.0 |
| Evaluation | Number of days until generation | — | — | — | — |
| | After three weeks | Poor | Poor | Poor | Poor |

As indicated in Tables 1 and 2, it was possible to capture a droplet on the first pattern layer in the examples of the present invention, but it was impossible to capture a droplet on any pattern layers in the comparative examples.

In Examples 4, 8, and 10, the droplets appeared near the boundaries (interfaces) between different pattern layers, but no droplets appeared near the center away from the boundaries. Therefore, it can be seen that it is preferable to make the distance between the pattern layers formed of a combination of the same materials 1.0 mm or smaller to capture a droplet efficiently.

In order to form a finer repeated structure, it is preferable to use the oleophobic fluorine-containing photosensitive material like Examples 1 to 4, 9, and 10. In order to use the area of the unit for electrostatic filter effectively, a finer repeated structure is preferable since the charge property near the boundaries (interfaces) between different pattern layers is high. The photosensitivity of the oleophobic fluorine-containing photosensitive material makes it possible to form an arbitrary fine pattern. Even if the applied liquid for forming the second pattern layer is spread over the first pattern layer formed in advance, the spread liquid is repelled because of the oleophobic properties of the first pattern layer, and the applied liquid can be applied correctly to the space portion.

As described above, according to the present invention, it is possible to fabricate a unit for electrostatic filter having a continuous collection effect and an electrostatic filter including the unit for electrostatic filter, with a repeated structure in which pattern layers formed of different substances having different work functions are adjacent and bonded to each other.

In the above-described examples, the L/S pattern layer is formed as the base material on a flat plate; however, the configuration is not limited thereto, and it is possible to form an arbitrary pattern layer on a base material in an arbitrary shape.

Additionally, in the above-described examples, the pattern is formed on the base material in a size comparable to the size of the target unit for electrostatic filter; however, the configuration is not limited thereto. It is possible to fabricate multiple units for electrostatic filter in a predetermined size by forming a formation material of each pattern layer on a base material in a size that allows formation of multiple electrostatic filter and then cutting the formation material into multiple pieces.

As described in the above examples, the unit for electrostatic filter in which a combination of substances having different work functions is used and the electrostatic filter including the unit for electrostatic filter can semi-permanently capture a small amount of organic substances in a VOC and a clean room such as a plasticizer and a fluxing agent that are causative substances of the sick house syndrome. Additionally, it is possible to improve adhesiveness to the base material, durability, and chemical resistance of the formed pattern layer by creating the pattern layer by using reactive resin.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-009958, filed Jan. 24, 2020, which is hereby incorporated by reference herein in its entirety.

What is claimed is:

1. A unit for an electrostatic filter, comprising:

a base material;

a first pattern layer; and a second pattern layer having a work function that is different from a work function of the first pattern layer, the first pattern layer and the second pattern layer being formed on the base material adjacent to and in contact with each other, and the first pattern layer and the second pattern layer being arranged repeatedly in an in-plane direction of the base material, wherein a difference between the work function of the first pattern layer and the work function of the second pattern layer is 1 eV or greater, wherein at least one of the first pattern layer or the second pattern layer comprises a resin, and wherein the base material differs from each of the first pattern layer and the second pattern layer.

2. The unit for electrostatic filter according to claim 1, wherein the first pattern layer and the second pattern layer are arranged repeatedly at a distance of 1.0 mm or smaller.

3. The unit for electrostatic filter according to claim 1, wherein the first pattern layer and the second pattern layer include an organic compound.

4. The unit for electrostatic filter according to claim 1, wherein at least one of the first pattern layer or the second pattern layer is formed of a reactive resin.

5. The unit for electrostatic filter according to claim 1, wherein one of the first pattern layer or the second pattern layer is formed of a photosensitive material.

6. The unit for electrostatic filter according to claim 1, wherein one of the first pattern layer or the second pattern layer is formed of a material including a fluorine-containing resin, and another of the first pattern layer or the second pattern layer is formed of a material including a urethane resin or an epoxy resin.

7. The unit for electrostatic filter according to claim 1, wherein one of the first pattern layer or the second pattern layer forms a line-and-space pattern, and another of the first pattern layer or the second pattern layer is arranged in a space portion of the line-and-space pattern.

8. An electrostatic filter, comprising:

a unit for the electrostatic filter, the unit including:

a base material;

a first pattern layer; and a second pattern layer having a work function that is different from a work function of the first pattern layer, the first pattern layer and the second pattern layer being formed on the base material adjacent to and in contact with each other, and the first pattern layer and the second pattern layer being arranged repeatedly in an in-plane direction of the base material, wherein a difference between the work function of the first pattern layer and the work function of the second pattern layer is 1 eV or greater, wherein at least one of the first pattern layer or the second pattern layer comprises a resin, and wherein the base material differs from each of the first pattern layer and the second pattern layer.

9. The electrostatic filter according to claim 8, wherein the first pattern layer and the second pattern layer are arranged repeatedly at a distance of 1.0 mm or smaller.

10. The electrostatic filter according to claim 8, wherein the first pattern layer and the second pattern layer include an organic compound.

11. The electrostatic filter according to claim 8, wherein at least one of the first pattern layer or the second pattern layer is formed of reactive resin.

12. The electrostatic filter according to claim 8, wherein one of the first pattern layer or the second pattern layer is formed of a photosensitive material.

13. The electrostatic filter according to claim 8, wherein one of the first pattern layer or the second pattern layer is formed of a material including a fluorine-containing resin, and another of the first pattern layer or the second pattern layer is formed of a material including a urethane resin or an epoxy resin.

14. The electrostatic filter according to claim 8, wherein one of the first pattern layer or the second pattern layer forms a line-and-space pattern, and another of the first pattern layer or the second pattern layer is arranged in a space portion of the line-and-space pattern.

15. The unit for electrostatic filter according to claim 1, further comprising a third pattern layer having a work function different from either of the first pattern layer or the second pattern layer, the third pattern layer being formed on the base material and in contact with at least one of the first pattern layer or the second pattern layer.

16. The electrostatic filter according to claim 8, wherein the unit further comprises a third pattern layer having a work function different from either of the first pattern layer or the second pattern layer, the third pattern layer being formed on the base material and in contact with at least one of the first pattern layer or the second pattern layer.

17. The unit for electrostatic filter according to claim 1, wherein the first pattern layer and the second pattern layer are arranged repeatedly at a distance of 0.05 mm or greater.

18. The electrostatic filter according to claim 8, wherein the first pattern layer and the second pattern layer are arranged repeatedly at a distance of 0.05 mm or greater.

19. The unit for electrostatic filter according to claim 1, wherein there is no gap between the first pattern and the second pattern.

20. The unit for electrostatic filter according to claim 1, wherein an entire face on a second pattern side of the first pattern is in contact with the second pattern.

21. The electrostatic filter according to claim 8, wherein there is no gap between the first pattern and the second pattern.

22. The electrostatic filter according to claim 8, wherein an entire face on a second pattern side of the first pattern is in contact with the second pattern.

* * * * *